United States Patent [19]

Kanamaru et al.

[11] Patent Number: 5,353,519
[45] Date of Patent: Oct. 11, 1994

[54] VACUUM DRYING EQUIPMENT

[75] Inventors: Toshihisa Kanamaru; Shinichi Ito, both of Fukuoka, Japan

[73] Assignee: Saibu Gas Co., Ltd., Fukuoka, Japan

[21] Appl. No.: 969,570

[22] Filed: Oct. 30, 1992

[30] Foreign Application Priority Data

Oct. 30, 1991 [JP] Japan .................. 3-285042

[51] Int. Cl.$^5$ ............................. F26B 13/30
[52] U.S. Cl. ............................. 34/92; 34/74; 34/86; 62/238.6
[58] Field of Search .................. 34/92, 15, 73, 74, 79, 34/5, 35, 86; 62/331, 324.1, 238.6

[56] References Cited

U.S. PATENT DOCUMENTS

| | | | |
|---|---|---|---|
| 3,909,957 | 10/1975 | Passey | 34/5 |
| 4,347,671 | 9/1982 | Dias et al. | 34/73 |
| 4,423,602 | 1/1984 | Venable | 62/238.6 |
| 4,565,161 | 1/1986 | Choquette | 62/238.6 |
| 4,949,473 | 8/1990 | Steinkamp | 34/92 |
| 5,199,187 | 4/1993 | Sutherland | 34/5 |
| 5,208,998 | 5/1993 | Oyler, Jr. | 34/5 |

FOREIGN PATENT DOCUMENTS 44-16877  7/1969  Japan.
57-55119  11/1982  Japan.

*Primary Examiner*—Denise Gromada
*Attorney, Agent, or Firm*—Sandler, Greenblum & Bernstein

[57] ABSTRACT

A vacuum drying apparatus for refuse or the like includes a drying vessel which receives a material, e.g., refuse, to be dried; a heat recoverer connected to the drying vessel through a steam discharge passage extending from the upper portion of the drying vessel; means for exhaust and drainage mounted to the heat recoverer; a heat pump; a radiator provided in the heat pump; heat exchanger for the drying vessel which introduces the heat of a refrigerant flowing through a piping of the heat pump into the drying vessel; and heat exchanger for the heat recoverer which introduces the heat of the refrigerant flowing through the piping of the heat pump into the heat recoverer. The refrigerant piping of the heat pump is capable of being switched over from a flow of the refrigerant through a circulation system for heating the drying vessel and cooling the heat recoverer, and discarding the heat generated by the radiator.

14 Claims, 5 Drawing Sheets

VACUUM DRYING EQUIPMENT

BACKGROUND OF THE INVENTION

1. Field of the Invention

The present invention relates to equipment for drying refuse and the like.

2. Description of the Related Art

Japanese Utility Model Publication No. 16877/69 and Japanese Patent Publication No. 55119/82 disclose examples of vacuum drying equipment, in which the internal pressure of a vessel which contains a material to be dried is reduced by vacuum to lower the boiling point of the material. A heat pump is used to heat the vessel to evaporate moisture from the material to be dried, and the evaporated moisture is condensed into water by refrigeration generated by the heat pump. The condensed water is then discharged to the exterior of the equipment.

In the vacuum drying equipment disclosed in the above publications, however, no consideration is given to the case where the article to be dried is left standing for a long time in the drying vessel before drying is performed. The aforementioned situation gives rise to problems when such vacuum drying apparatus are used for the drying of refuse, but no measures have been taken to address articles which are not dried right away.

With conventional drying equipment, drying is not always performed immediately after introduction of refuse into the drying vessel. Rather, refuse is often introduced incrementally several times throughout the day and then is dried cumulatively at a single time in the evening. Further, when the amount of refuse is small, the refuse is sometimes not even dried daily, but is heaped up without treatment until a predetermined amount is reached, and then the refuse which has been heaped up two or three days is dried cumulatively at one time.

Therefore, when the outdoor temperature is high, for example in the summertime, refuse which has been introduced into the drying vessel in the morning will rot to some extent, so that an offensive smell is dissipated to the exterior of the equipment at every opening of the inlet.

Further, if rotten refuse is dried in the equipment, volatile organic substances such as, for example, ammonia, methyl mercaptan, trimethylamine and hydrogen sulfide will be mixed into the waste water discharged to the exterior of the equipment, so that the problem of offensive smell arises also with respect to the waste water.

SUMMARY OF THE INVENTION

The present invention has been accomplished in view of the above-mentioned circumstances, and it is a primary object of the invention to provide vacuum drying equipment for refuse whereby a material to be dried, such as, for example, refuse and the like, which has been introduced into a drying vessel can be substantially prevented from rotting until a drying treatment is started.

It is another object of the present invention to prevent the discharge of waste water having an offensive smell, and to do so at a low cost, even when drying refuse or the like which has already been rotten to some extent, by using the vacuum drying equipment according to the invention.

In the vacuum drying equipment of the present invention, in order to achieve the above-mentioned objects, refrigeration which is generated by a heat pump is utilized not only for the condensation of moisture after recovery of waste heat from the steam evaporated from the material being dried in the drying treatment, but also for cold storage of the to-be-dried material after it has been introduced into the drying vessel up until the start of drying. The vacuum drying equipment of the invention includes a drying vessel formed as a pressure-resistant closed vessel to receive therein a material to be dried, e.g., refuse; a steam discharge passage extending from the upper portion of the drying vessel for discharging steam which is produced in the drying vessel; a heat recoverer connected to the drying vessel through the steam discharge passage; means for forced exhaust and drainage, provided in the heat recoverer; a heat pump comprising a refrigerant piping comprising a closed circulation piping with refrigerant sealed therein, as well as a compressor and a capillary tube which are disposed in the refrigerant piping; a radiator provided in the heat pump; heat exchange means for the drying vessel which functions to introduce heat from the refrigerant flowing through the refrigerant piping of the heat pump into the drying vessel and perform heat exchange with the drying vessel; and heat exchange means for the heat recoverer which functions to introduce heat from the refrigerant flowing through the refrigerant piping of the heat pump into the heat recoverer and perform heat exchange with the heat recoverer. The refrigerant piping of the heat pump is provided with flow path switching means for change-over between a circulation system for heating, wherein the refrigerant fed under pressure by the compressor is allowed to flow in the direction of the heat exchange means for the drying vessel, capillary tube, heat exchange means for the heat recoverer, and compressor; and a circulation system for cooling, wherein the refrigerant is circulated in the order of the compressor, radiators, capillary tube, heat exchange means for the drying vessel, and compressor.

In the vacuum drying equipment constructed as above, when the refrigerant piping is configured as the circulation system for heating, the drying vessel is heated through the heat exchange means for the drying vessel by the heat generated in the heat pump, thereby evaporating moisture from a material to be dried, e.g., refuse, contained in the drying vessel. At the same time, waste heat is recovered through the heat exchange means, by the heat recoverer, from the steam which is discharged from the drying vessel, whereby the steam is condensed into water, which is discharged as drain water to the exterior of the equipment.

On the other hand, when the refrigerant piping is configured as the circulation system for cooling, the drying vessel is cooled by refrigeration generated through the heat exchange means for the drying vessel, to effect cold storage of refuse or the like contained in the drying vessel; while heat is discharged through the radiator.

As the heat exchange means for the drying vessel and that for the heat recoverer, there is adapted a construction wherein part of the refrigerant piping of the heat pump is disposed in a coiled or meandering form directly in the drying vessel and the heat recoverer to introduce the heat and refrigeration generated by the heat pump directly into the drying vessel and the heat recoverer, or a construction wherein the heat and refrigeration from the heat pump are once heat exchanged with water and then introduced into the drying vessel and the heat recoverer.

The means for exhaust and drainage provided in the heat recoverer may be a single means which fulfills both exhaust and drainage functions, or it may comprise exhaust means and drainage means which are independent of each other. By adopting the latter construction it is possible to improve the performance of each function.

On the other hand, as mentioned previously, in the case where the material to be dried is at least partially rotted refuse or fish garbage or the like, volatile organic substances such as ammonia, methyl mercaptan, or trimethylamine or hydrogen sulfide mixes into the waste water, so that if the waste water is discharged as is, it will produce a problematic offensive smell.

Such problems can be solved with the vacuum drying equipment of the instant invention, using independent exhaust means and drainage means in the heat recoverer, connecting the drainage means to a water tank having both an air intake port and a drain port to store the discharged water in the water tank, while connecting the exhaust means to an aerator disposed within the water tank to jet air which has been sucked from the drying vessel through the steam discharge passage and the heat recoverer, into the drain water stored in the water tank, thereby aerating the water in the tank to separate the volatile organic substance as offensive component from the water, and then decomposing the separated organic substance.

In this case, if an ejector is disposed upstream of the exhaust means, in the exhaust pipe which connects the heat recoverer and the aerator through the exhaust means, and if the upper space of the water tank is connected by pipes to both a nozzle of the ejector and the offensive smell decomposing device, the air in the water tank sucked by the ejector through the pipe circulates so as to pass through the exhaust pipe and the aerator and to return into the water tank. This action is ensured by continuing operation of the forced exhaust means even after the air in the drying vessel has been exhausted. This circulation of air promotes the aeration of the water stored in the drain water tank.

The offensive smell decomposing device may, for example, be of the type wherein the offensive component is burnt together with gas by means of a gas burner, or of the type wherein the offensive component is decomposed using a catalyst.

The above and other features of the present invention, as well as the objects of the invention, will become more apparent upon making reference to preferred embodiments which will be described below in connection with the accompanying drawings.

DETAILED DESCRIPTION OF THE PREFERRED EMBODIMENTS

Figure 1:
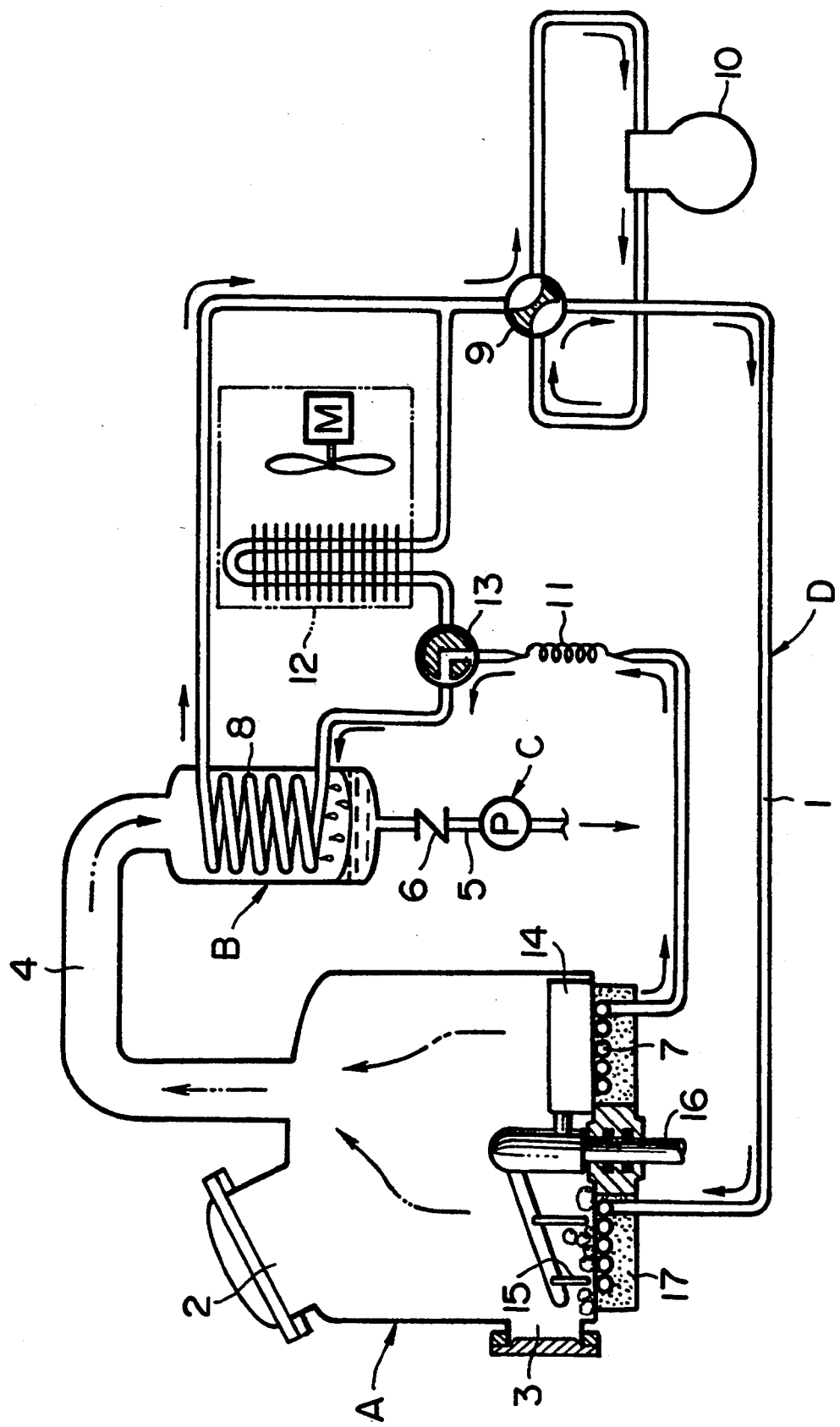
FIG. 1 is a schematic construction diagram of a vacuum drying equipment according to an embodiment of the present invention showing an operating state in a drying treatment.

In FIG. 1, the construction of a vacuum drying equipment apparatus embodying the invention is schematically illustrated.

This vacuum drying equipment comprises a drying vessel A for receiving refuse or other material to be dried therein; a heat recoverer B for receiving moisture evaporated from the refuse or other material to be dried and condensing it into water; a water-sealed type vacuum pump C serving as an exhaust and drainage means for de-aerating the interior of the drying vessel A by suction through the heat recoverer B and forcibly discharging water which is produced within the heat recoverer B; and a heat pump D which supplies heat for drying the refuse in the drying vessel A in a drying operation, and also supplies refrigeration for the condensation of moisture in the heat recoverer B in the same operation. Further, heat pump D supplies refrigeration for the cold storage of refuse in the drying vessel A in a cold storage operation. The heat and refrigeration generated in the heat pump D are fed to the drying vessel A and the heat recoverer B, directly from piping 1 of the heat pump.

The drying vessel A is constructed as a pressure-resistant closed vessel having an inlet 2 into which is introduced wet or damp refuse before treatment, and an outlet 3 for taking out dried refuse after treatment. A steam discharge passage 4 is connected to the upper portion of the drying vessel A.

The steam discharge passage 4 is formed in an inverted U shape with one end connected to drying vessel A and the opposite end thereof connected to the heat recoverer B. To the bottom of the heat recoverer B is connected a drain pipe 5, in which are disposed a check valve 6 and the water-sealed vacuum pump C so that the former is on the upstream side of the latter.

Though not shown, the vacuum pump C is of a conventional known structure wherein the body thereof comprises a circular casing with an impeller mounted eccentrically therein, and wherein an appropriate amount of water is accommodated in the casing. Upon rotation of the impeller, the resulting centrifugal force causes the water to form a circular water film concentric with the casing, and a closed space is formed by the water film and adjacent blades. Then as the blades rotate, the volume of the space changes, thereby creating suction compression and continuous discharge.

On the other hand, the heat pump D comprises the refrigerant piping 1 constituted by a closed piping with refrigerant, e.g., freon, sealed therein, as well as a compressor 10 and a capillary tube 11, which are disposed in line with the refrigerant piping 1. This piping is constructed in such a manner that the direction in which the refrigerant fed under pressure by the compressor 10 passes through the capillary tube 11 can be changed between forward and reverse by means of a four way valve 9.

According to the construction of the refrigerant piping 1, moreover, a heat exchange means 7 for the drying vessel is interposed between the compressor 10 and the capillary tube 11 in a refrigerant flowing direction (i.e., forward direction). Between the capillary tube 11 and the compressor 10, in the reverse direction, are disposed a heat exchange means 8 for the heat recoverer and a radiator 12 in a parallel fashion through a three way valve 13. The three way valve 13 is constructed so as to switch over the flow path in interlock with the four way valve 9, so that when the refrigerant passes in the forward direction through the capillary tube 11, it passes through the heat exchange means 8 for the heat recoverer, while in the reverse flow, the refrigerant passes through the radiator 12.

Figure 3:
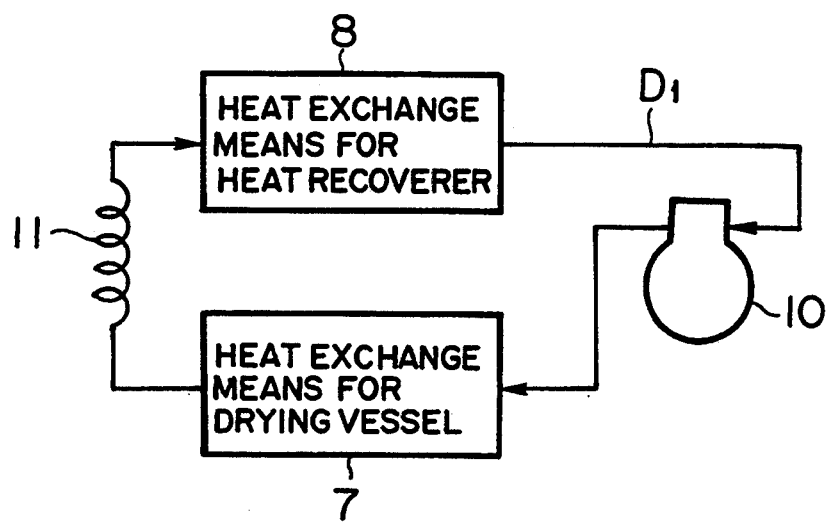
FIG. 3 is an explanatory view showing a piping construction in a drying treatment.
Figure 4:
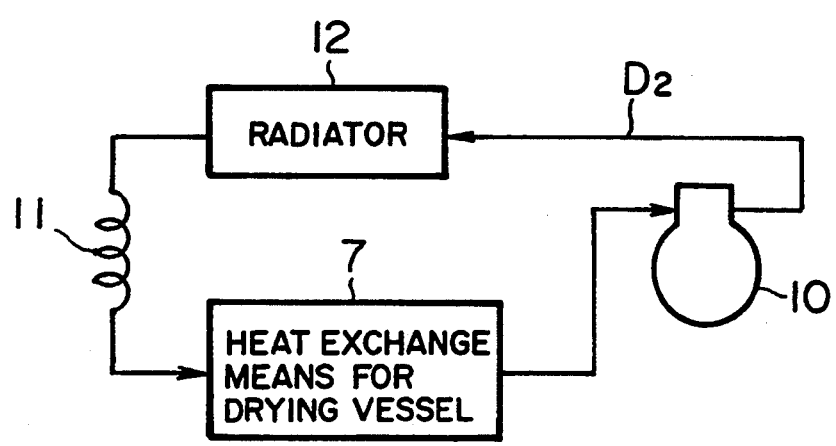
FIG. 4 is an explanatory view showing a piping construction in cold storage.

Thus, in the refrigerant piping 1, is included a circulation system (hereinafter referred to as the "heating circulation system $D_1$") as shown in FIG. 3, in which the refrigerant is circulated in the order of compressor 10, heat exchange means 7 for the drying vessel, capillary tube 11, heat exchange means 8 for the heat recoverer and compressor 10; and a circulation system ("cooling circulation system $D_2$" hereinafter) as shown in FIG. 4, in which the refrigerant is circulated in the order of compressor 10, radiator 12, capillary tube 11, heat exchange means 7 for the drying vessel and compressor 10. Selection between the two systems is accomplished by switching over from one to the other by a changeover operation of the four way valve 9 and the three way valve 13.

In the refrigerant piping 1, the heat exchange means 7 for the drying vessel A is disposed in a meandering or spiral form along the underside of the bottom plate of the drying vessel A, and the heat exchange means 8 for the heat recoverer is inserted in a coiled form into the heat recoverer B.

In the drawings, reference numeral 14 denotes a rotary spatula for scratching off a pasty component of refuse to prevent the adhesion thereof to the bottom plate of the drying vessel A, thereby maintaining the efficiency of the transfer of heat from the heat exchange means 7. Reference numeral 15 denotes a tool (e.g., a fork) for loosening the refuse to prevent agglomeration, both spatula 14 and fork 15 being mounted to a rotatable shaft 16 extending through the bottom plate of the drying vessel A.

The rotatable shaft 16 is rotated by means of a motor (not shown). Further, the numeral 17 denotes a heat insulating material.

In the vacuum drying equipment thus constructed, if the refrigerant piping 1 is configured as the heating circulation system D1 in which the refrigerant flows in the order of compressor 10, heat exchange means 7 for the drying vessel, capillary tube 11, heat exchange means 8 for the heat recoverer and compressor 10, as shown in FIGS. 1 and 3, by operating the compressor 10 and the four and three way valves 9, 13, the pressure of the pipe portion between the compressor 10 and the capillary tube 11, including the heat exchange means 7 for the drying vessel, in the flowing direction of ! he refrigerant, increases due to a passage resistance of the capillary tube 11 portion, resulting in condensation of the refrigerant and rise of temperature while the pressure of the pipe portion between the capillary tube 11 and the compressor 10, including the heat exchange means 8 for the heat recoverer, decreases, resulting in evaporation of the refrigerant and drop of temperature.

Consequently the drying vessel A is heated through the heat exchange means 7 for the drying vessel, while the heat recoverer B is cooled through the heat exchange means 8 for the heat recoverer.

Therefore, if the drying vessel A is hermetically sealed after introduction therein of a material to be dried, e.g. refuse, and then the water-sealed vacuum pump C is operated to reduce the internal pressure of the drying vessel until the boiling point of water becomes equal to the outdoor temperature, the introduced refuse is heated by a heating energy from the heat exchange means 7 for the drying vessel and moisture is evaporated, so that the steam pressure in the drying vessel A is increased and coupled with the operation of the vacuum pump C, the steam in the drying vessel flows into the steam discharge passage 4 whose pressure is lower. The steam then enters the heat recoverer B, where the heat thereof is recovered by the refrigerated line of the heat exchange means 8 for the heat recoverer, with the result that the steam is condensed into water of a smaller volume, which is discharged as drain water through the vacuum pump C.

Thus, evaporation and condensation occur continuously in the drying vessel A and the heat recoverer B, respectively to dry the refuse as the material to be dried.

Figure 2:
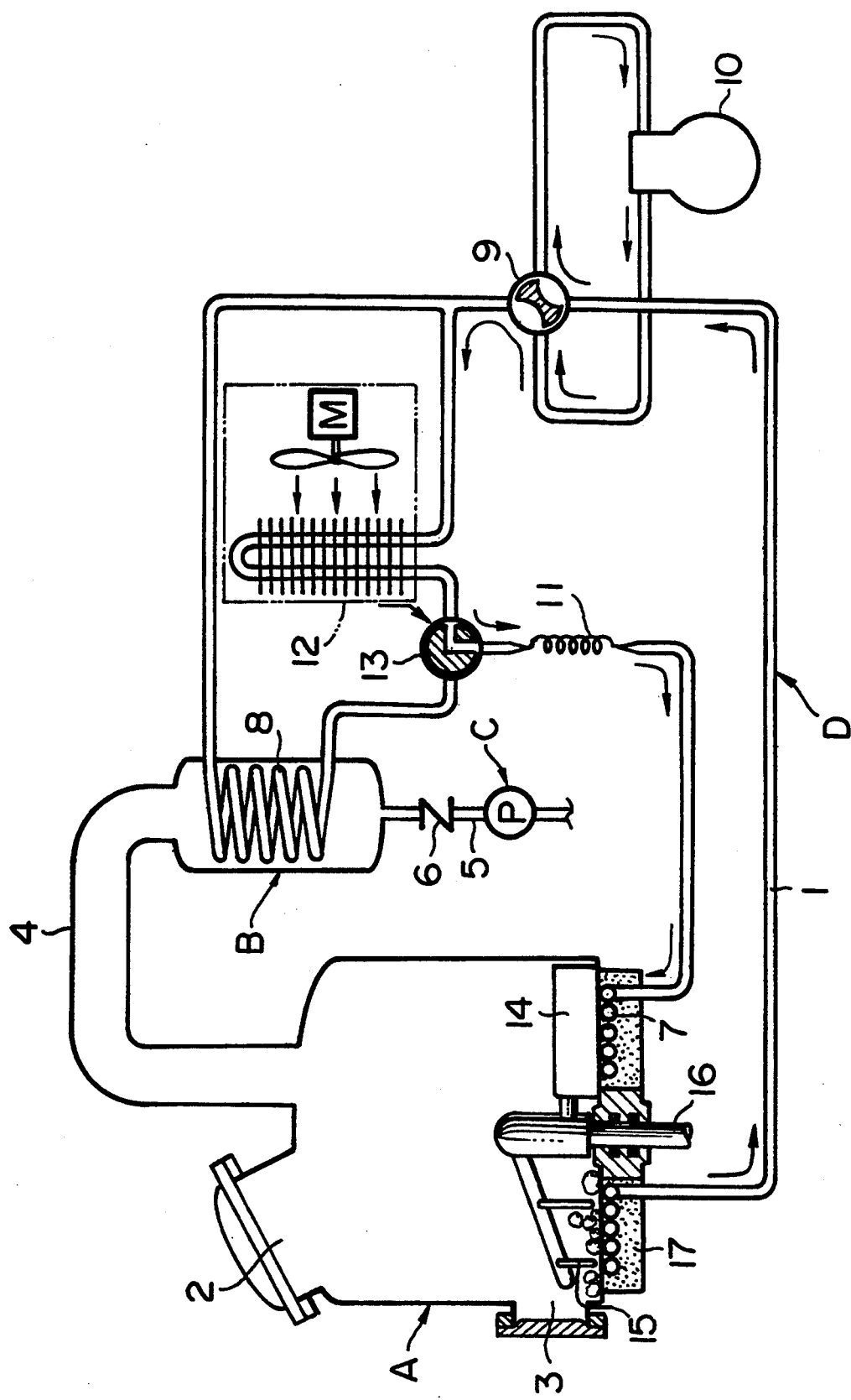
FIG. 2 is also a schematic construction diagram thereof, showing a state wherein a drying vessel is utilized for cold storage.

When the refrigerant flowing direction with respect to the capillary tube 11 is reversed, the refrigerant piping 1 is configured as the cooling circulation system $D_2$ in which the refrigerant flows in the order of compressor 10, radiator 12, capillary tube 11, heat exchange means 7 for the drying vessel and compressor 10, by operating the four and three way valves 9 and 13, as shown in FIG. 2. The pressure of the pipe portion between the compressor 10 and the capillary tube 11, including the radiator 12, in the refrigerant flowing direction, increases due to a passage resistance of the capillary tube 11 portion, resulting in that the refrigerant is condensed and the temperature rises, while the pressure of the pipe portion between the capillary tube 11 and the compressor 10, including the heat exchange means 7 for the drying vessel, decreases, so that the refrigerant is evaporated and the temperature drops.

Consequently, the drying vessel A is cooled by the refrigeration through the heat exchange means 7 for the drying vessel, while the heat is radiated and discarded by the radiator 12.

As a result, the interior of the drying vessel A is maintained at a low (refrigerated) temperature and hence refuse or the like contained therein is cooled and held in the state of cold storage.

Therefore, when this vacuum drying equipment is used for the drying of refuse for example, but when the drying treatment is not to be conducted immediately after introduction of the refuse, but only after a predetermined level of refuse has been accumulated, it is possible to keep the introduced refuse in cold storage to prevent decay, until such time as the drying treatment is performed. Thus, it is possible to prevent an offensive smell from being dissipated to the exterior every time the refuse is introduced into the drying vessel, and until execution of the drying treatment.

Figure 5:
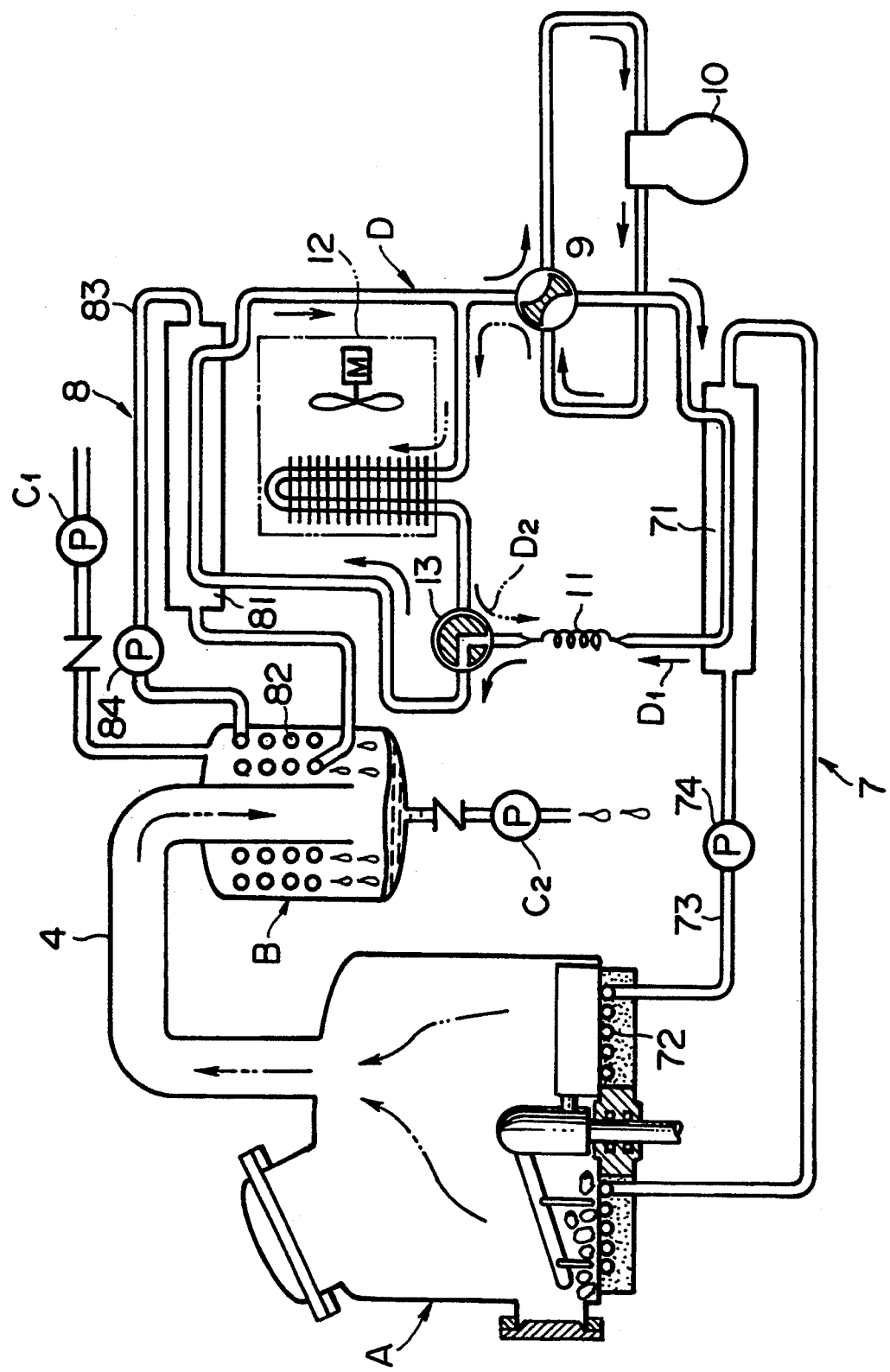
FIG. 5 is a schematic construction diagram of a vacuum drying equipment according to another embodiment of the present invention, showing an operating state in a drying treatment.

FIG. 5 shows vacuum drying equipment according to a second embodiment of the present invention. Components which are the same as in the first embodiment have been assigned the same reference numerals. This embodiment comprises a drying vessel A, a heat recoverer B connected to the drying vessel A through a steam discharge passage 4, exhaust and drainage means C (i.e., C₁ and C₂), and a heat pump D. Heat exchange means 72 for the drying vessel introduces the heat of refrigerant flowing through a refrigerant piping 1 of the heat pump D into the drying vessel A and makes heat exchange with the drying vessel. Heat exchange means 82 for the heat recoverer introduces the heat of refrigerant flowing through the refrigerant piping 1 of the heat pump D into the heat recoverer B and makes heat exchange with the heat recoverer. Heat exchange means 72 and 82 are constructed in such a manner that the heat and refrigeration of the heat pump D are once heat-exchanged with water and thereafter introduced into the drying vessel A and heat recoverer B.

This second embodiment may be designated an indirect heating/cooling system, assuming the previous first embodiment to be a direct heating/cooling system wherein the heat and refrigeration generated in the heat pump D are fed directly from the refrigerant piping 1 of the heat pump to the drying vessel A and the heat recoverer B.

In the second embodiment, as the exhaust and drainage means C, a vacuum pump C1, which is dedicated to exhaust, is connected to the upper portion of the heat recoverer B, and a drain pump C2, which is dedicated to drainage, is connected to the bottom of the heat recoverer B. Thus, unlike the foregoing water-sealed type vacuum pump for both exhaust and drainage, there are used separate means for exhaust and drainage, respectively.

Also in this second embodiment which may be designated an indirect heating/cooling system, as mentioned above, the same type of water-sealed type vacuum pump for both exhaust and drainage, described in the previous first embodiment can be used for each of the exhaust and drainage means C (C₁ and C₂). The use of independent means C1 and C2 exclusively for exhaust and drainage, respectively, is very effective in improving the exhaust and drainage functions.

It goes without saying that the above-mentioned structure wherein the vacuum pump C1 and drain pump C2 are used exclusively for exhaust and drainage, respectively, and are connected to the upper portion and the bottom, respectively, of the heat recoverer B, can also be adopted in a direct heating/cooling system such as in the previous first embodiment.

In the embodiment illustrated in FIG. 5 the heat pump D comprises a heat pump type refrigeration unit provided integrally with two heat exchangers (hereinafter referred to as the first heat exchanger 71 and second heat exchanger 81, respectively). By changing over operation of a four way valve 9 and a three way valve 13, the refrigerant piping of the heat pump can be changed over between a circulation system D1 for heating in which the refrigerant flows in the order of compressor 10, first heat exchanger 71 capillary tube 11, second heat exchanger 81 and compressor 10, and circulation system D2 for cooling in which the refrigerant flows in the order of compressor 10, radiator 12, capillary tube 11, second heat exchanger 81 and compressor 10.

The first heat exchanger 71 constitutes a part of the heat exchange means 7 for the drying vessel, while the second heat exchanger 81 constitutes a part of the heat exchange means 8 for the heat recoverer. The heat exchange means 7 for the drying vessel comprises a circulation piping 73 which includes both a coil type heat exchanger 72 ("third heat exchanger 72" hereinafter) extending coil-like along the bottom plate of the drying vessel A, and the first heat exchanger 71, while the heat exchange means 8 for the heat recoverer comprises a circulation piping 83 which includes both a coil type heat exchanger 82 ("fourth heat exchanger 82" hereinafter) disposed within the heat recoverer B and the second heat exchanger 81.

The heat exchange means 7 for the drying vessel and the heat exchange means 8 for the heat recoverer are provided with circulating pumps 74 and 84, respectively in which water is sealed and which causes the water to circulate forcibly.

It is also possible to construct the third heat exchanger 72 as a water jacket type heat exchanger.

In this embodiment, when the refrigerant piping 1 of the heat pump D is constructed as the heating circulation system D1, the refrigeration generated in the heat pump D is heat-exchanged by the second heat exchanger 81, and the water circulating in the heat exchange means 8 for the heat recoverer absorbs the heat of the water, thereby cooling the water, while the heat of the heat pump D is heat-exchanged by the first heat exchanger 71 with the water circulating in the heat exchange means 7 for the drying vessel, to heat the water.

The water cooled in the second heat exchanger 81 flows to the fourth heat exchanger 82 of the heat exchange means 8 for the heat recoverer to cool the heat recoverer B, while the water heated in the first heat exchanger 71 flows to the third heat exchanger 72 of the heat exchange means 7 for the drying vessel, to heat the drying vessel A.

Thus, the drying vessel A utilizes the heat of the heat pump D indirectly in the form of heat exchange with water, while the heat recoverer B utilizes the refrigeration of the heat pump indirectly in the form of heat exchange with water.

On the basis of the vacuum drying principle described previously the drying vessel A and the heat recoverer B dry the material to be dried and the water resulting from condensation in the heat recoverer B is discharged to the exterior of the equipment. Further, the heat energy which has been consumed for evaporation in the interior of the drying vessel A is recovered for recycle by the heat recoverer B.

On the other hand, if the refrigerant piping 1 of the heat pump D is constructed as the cooling circulation system D2 by change-over operation of the four way valve 9 and three way valve 13, the refrigeration generated in the heat pump D is heat-exchanged by the first heat exchanger 71 with the water circulating in the heat exchange means 7 for the drying vessel, to cool the water, and this cooled water cools the drying vessel A through the heat exchanger 72 of the heat exchange means 7 for the drying vessel. In this case, the heat of the heat pump D is discarded by the radiator 12.

In this embodiment, since the heat pump D can be constructed as a chiller unit in advance, it is not necessary to machine the piping of the heat pump D at an installation site of the equipment and hence there is no fear of accidental leakage of freon gas during installation or maintenance.

According to the vacuum drying equipment of the present invention, as set forth above, the moisture evaporated from a material to be dried, e.g. refuse, is cooled into water in the heat recoverer B and the water is discharged as drain water to the exterior of the equipment by the drainage means C or C2.

Therefore, in the case where the material to be dried is fish garbage or refuse already rotten to some extent and such volatile substances as ammonia, methyl mercaptan, trimethylamine or hydrogen sulfide is mixed into drain water, there arises the problem of an offensive smell of the drain water.

Figure 6:
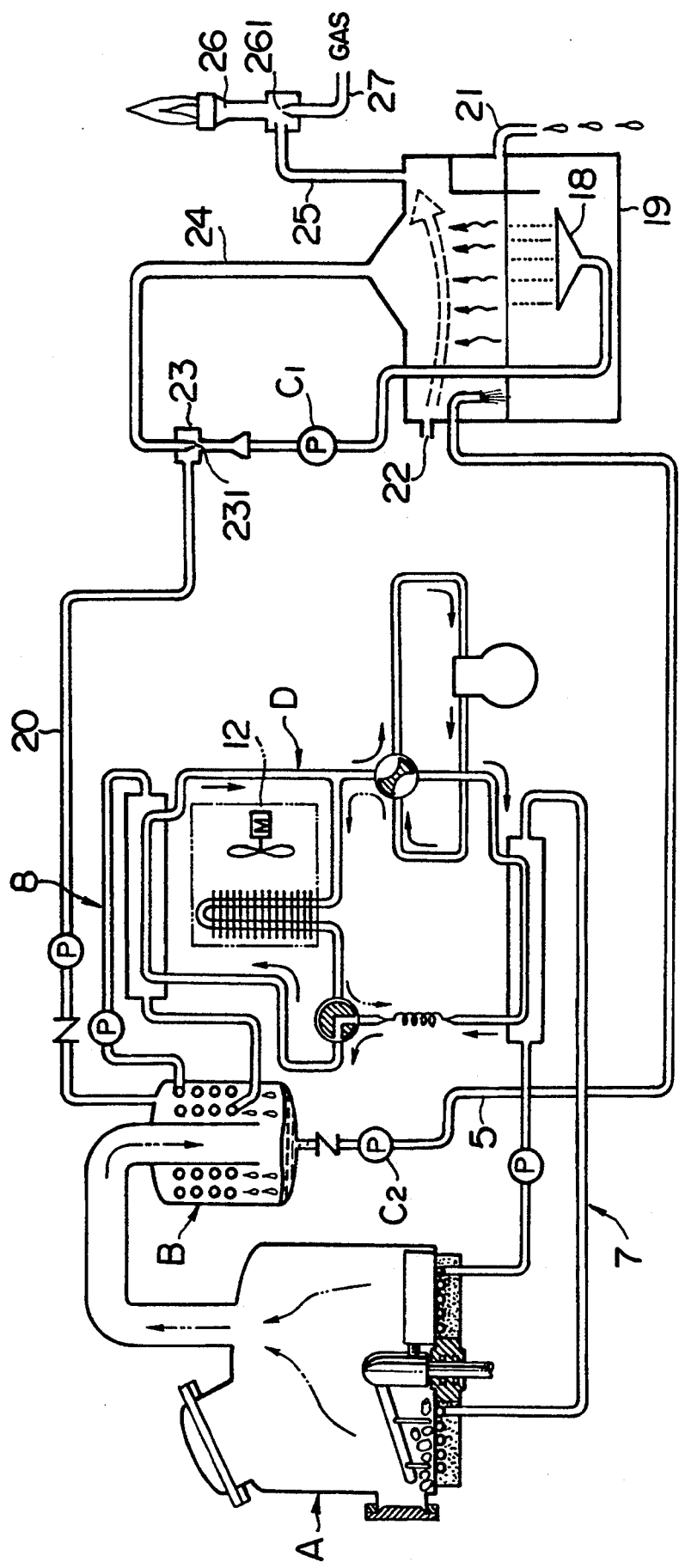
FIG. 6 is a schematic construction diagram of a vacuum drying equipment having a deodorizing function according to a further embodiment of the present invention, showing an operation (deodorizing) state in a drying treatment.

Referring now to FIG. 6, vacuum drying equipment according to a third embodiment of the present invention is illustrated for eliminating odor problems previously mentioned.

In this embodiment, the structure to be designated an indirect heating/cooling system, which has been explained with regard to the second embodiment illustrated in FIG. 5 is shown as a principal portion of the drying equipment. It is also possible to use an exhaust-dedicated vacuum pump C2 and a drainage-dedicated pump C1 in place of the water-sealed type vacuum pump as exhaust and drainage means C in the structure to be designated a direct heating/cooling system which has been explained in the first embodiment.

In FIG. 6, the vacuum drying equipment is provided with a water tank 19 having an aerator 18 separate from the principal portion of the drying equipment. A drain pipe 5 extending from the bottom of the heat recoverer B and provided with a drain pump C2 is connected to a water tank 19, while an exhaust pipe 20 extending from the upper portion of the heat recoverer B and provided with a vacuum pump C1 is connected to the aerator 18 in the water tank 19.

The upper surface of the water tank 19 is closed, and a drain port 21 and an air intake port 22 are formed in the side wall of the water tank 19, in such a manner that the port 21 is positioned lower than the port 22. Further, on the inner bottom portion of the water tank, is disposed the aerator 18 which is connected to the exhaust pipe 20.

The aerator 18 has a cavity portion (not shown) for introducing air therein through the exhaust pipe 20 from the heat recoverer B and also has a large number of small holes for dispersing the thus-introduced air into the water in the tank 19.

The exhaust pipe 20 is provided with an ejector 23 upstream of the vacuum pump C1, that is, on the heat recoverer B side. On the other hand, an air return pipe 24 and an offensive smell component withdrawing pipe 25 are connected to the upper portion of the water tank 19. The air return pipe 24 is connected to a nozzle 231 of the ejector 23, while the offensive smell components withdrawing pipe 25 is connected to a gas burner 26.

More specifically the gas burner 26, which constitutes an offensive smell decomposer, is connected to a gas pipe 27 and the offensive smell components withdrawing pipe 25 is connected to the gas burner in a position close to a gas nozzle 261 disposed at the base portion of the gas burner. According to this embodiment, if the refrigerant piping 1 of the heat pump D is constructed as the heating circulation system D1, as illustrated in the figure, by operating the four way valve 9 and three way valve 13, the drying vessel A is heated by the heat of the heat pump D through the heat exchange means 7 for the drying vessel, while the heat recoverer B is cooled by the refrigeration from the heat pump D through the heat exchange means 8 for the heat recoverer, whereby the steam evaporated from the refuse in the drying vessel A is condensed in the heat recoverer B and the resulting water is fed to the water tank 19 through the drain pipe 5 by means of the drain pump C2 and is stored in water tank 19.

On the other hand, the air which has been withdrawn from the drying vessel A and the heat recoverer B by means of the vacuum pump C1 is fed to the aerator 18 through the exhaust pipe 20 and is jetted from the aerator 18 into the drain water stored in the water tank 19, whereby the water in the tank is aerated.

The air in the drying vessel A and the heat recoverer B is used up with the lapse of time, but by allowing the vacuum pump C1 to operate continuously even thereafter, the air in the water tank 19 is drawn by suction through the air return pipe by means of the ejector 23, then passes through the exhaust pipe 20 and aerator 18 and is returned into the water tank 19. At this time, outside fresh air is taken into the tank through the air intake port 22 and is mixed into the circulating air.

As a result of such circulation of the air in the water tank 19, the aeration of the drain water stored in the water tank is promoted and water is separated from the volatile organic substances incorporated in the drain water.

In this state, when gas is fired in the gas burner 26, the air which contains the volatile organic substance in the water tank 19 is taken into the burner 26 through the offensive smell component withdrawing pipe 25 due to a negative pressure around the gas nozzle 261 induced by the jet of gas from the gas nozzle into the burner 26, while fresh air in an amount corresponding to the amount of air which has thus been taken into the burner 26 is introduced into the upper space in the water tank 19 through the air intake port 22 from the exterior.

The air introduced into the burner from the water tank 19, which contains a volatile organic substance, is fed to the flame hole in a mixed state with fuel gas and is burnt therein.

In the case where the volatile organic substance is ammonia, for example, it is decomposed into nitrogen gas and water.

Therefore, by continuing the aeration of drain water under continuous operation of the vacuum pump C1 even after evacuation of the interior of the drying vessel A, the volatile organic substance contained in the drain water can be separated and decomposed whereby it is made possible to deodorize the drain water discharged from the drain port 21 of the water tank 19.

Thus, the drain water discharged from the drain port 21 of the water tank 19 no longer has an offensive smell.

In the vacuum drying equipment thus constructed, as described above, the vacuum pump C1 for evacuating the interior of the drying vessel A is allowed to operate continuously even after the interior of the drying vessel has been evacuated, and the air in the drain water holding tank 19 is thereby circulated through the passage with the ejector 23 disposed therein and is then jetted into the drain water to aerate the drain water. Therefore, it is not necessary to specially provide a pump for aeration, which reduces the cost of deodorization of the drain water, and at the same time, makes a compact device for deodorization.

Although in the above description there is adopted a method wherein a gas burner is used as the offensive smell components decomposer 26, and an offensive component is introduced into the gas burner for combustion and decomposition, this method may be substituted by a method wherein the offensive component is decomposed using a catalyst.

Although the invention has been described with reference to particular means, materials and embodiments, it is to be understood that the invention is not limited to the particulars disclosed and extends to all equivalents within the scope of the claims.

We claim:

1. A vacuum drying apparatus comprising:
   a drying vessel which is formed as a pressure-resistant closed vessel and which receives therein a material to be dried;
   a steam discharge passage connected to an upper portion of said drying vessel to discharge steam which is produced within said drying vessel;
   a heat recoverer connected to said drying vessel through said steam discharge passage;
   means for exhaust and drainage mounted to said heat recoverer for exhausting gases formed upon drying the material to be dried, and for draining condensation products formed by condensation of the gases formed upon drying the material to be dried;
   a heat pump comprising a closed circulation piping with a refrigerant sealed therein as well as a compressor and a capillary tube which are disposed in line with said piping;
   a radiator provided in said heat pump;
   heat exchange means for said drying vessel which introduce heat from the refrigerant flowing through said piping of said heat pump into said drying vessel by exchanging heat with said drying vessel; and
   heat exchange means for said heat recoverer which introduce heat from the refrigerant flowing through said piping of said heat pump into said heat recoverer by exchanging heat with said heat recoverer, said piping of said heat pump being provided with flow path switching means to switch the flow of the refrigerant which is fed under pressure by said compressor between a circulation system for heating, wherein the refrigerant is circulated in the order of said compressor, said heat exchange means for the drying vessel, said capillary tube, said heat exchange means for the heat recoverer and the compressor; and a circulation system for cooling, wherein the refrigerant is circulated in the order of said compressor, said radiator, said capillary tube, said heat exchange means for the drying vessel and said compressor.

2. A vacuum drying apparatus according to claim 1, wherein said heat exchange means for said drying vessel and said heat exchange means for said heat recoverer each comprise a part of said piping of said heat pump disposed integrally in said drying vessel and said heat recoverer, respectively, wherein said heat exchange means for said drying vessel transmits the heat of the refrigerant flowing through said piping directly to said drying vessel, and said heat exchange means for said heat recoverer transmits heat from the refrigerant flowing through said piping for said heat recoverer.

3. A vacuum drying apparatus according to claim 1, wherein said heat exchange means for said drying vessel comprise a water circulation pipe which includes a first heat exchanger disposed integrally in said refrigerant piping of said heat pump and a third heat exchanger disposed in said drying vessel; wherein said heat exchange means for said heat recoverer comprise a water circulation pipe which includes a second heat exchanger disposed integrally in said piping of said heat pump and a fourth heat exchanger disposed in said heat recoverer, and the heat of the refrigerant flowing through said piping of said heat pump is once heat-exchanged with water and thereafter transmitted to said drying vessel and said heat recoverer.

4. A vacuum drying apparatus according to claim 2, wherein said means for exhaust and drainage are connected to a lower portion of said heat recoverer and function, in combination, to remove exhaust and drainage.

5. A vacuum drying apparatus according to claim 3, wherein said means for exhaust and drainage are connected to a lower portion of said heat recoverer and function, in combination, to remove exhaust and drainage.

6. A vacuum drying apparatus according to claim 2, wherein said means for exhaust and drainage comprise forced exhaust means connected to an upper portion of said heat recoverer and forced drainage means connected to a lower portion of said heat recoverer; wherein said forced exhaust means and said forced drainage means each function independently of the other.

7. A vacuum drying apparatus according to claim 3, wherein said means for exhaust and drainage comprise forced exhaust means connected to an upper portion of said heat recoverer and forced drainage means connected to a lower portion of said heat recoverer; wherein said forced exhaust means and said forced drainage means each function independently of the other.

8. A vacuum drying apparatus according to claim 6 wherein said drainage means are connected to a water tank having an air intake port and a drain port, and said exhaust means are connected to an aerator disposed in the interior of said water tank, an ejector is disposed upstream of said exhaust means in an exhaust pipe which connects said heat recoverer to said aerator through said exhaust means and an upper space in said water tank is connected to a nozzle of said ejector and also to an offensive smell component decomposer through pipes, respectively.

9. A vacuum drying apparatus according to claim 7 wherein said drainage means are connected to a water tank having an air intake port and a drain port, and said exhaust means are connected to an aerator disposed in the interior of said water tank, an ejector is disposed upstream of said exhaust means in an exhaust pipe which connects said heat recoverer to said aerator through said exhaust means and an upper space in said water tank is connected to a nozzle of said ejector and also to an offensive smell component decomposer through pipes, respectively.

10. A vacuum drying apparatus according to claim 8, wherein said offensive smell component decomposer comprises a gas burner for burning a fuel gas which is supplied separately.

11. A vacuum drying apparatus according to claim 9, wherein said offensive smell component decomposer comprises a gas burner for burning a fuel gas which is supplied separately.

12. A vacuum drying apparatus comprising:
    a drying vessel which is formed as a pressure-resistant closed vessel and which receives therein a material to be dried;
    a steam discharge passage connected to an upper portion of said drying vessel to discharge steam which is produced within said drying vessel;
    a heat recoverer connected to said drying vessel through said steam discharge passage;

means for exhaust and drainage mounted to said heat recoverer;

a heat pump comprising a closed circulation piping with a refrigerant sealed therein as well as a compressor and a capillary tube which are disposed in line with said piping;

a radiator provided in said heat pump;

heat exchange means for said drying vessel which introduce heat from the refrigerant flowing through said piping of said heat pump into said drying vessel by exchanging heat with said drying vessel; and heat exchange means for said heat recoverer which introduce heat from the refrigerant flowing through said piping of said heat pump into said heat recoverer by exchanging heat with said heat recoverer, said piping of said heat pump being provided with flow path switching means to switch the flow of the refrigerant which is fed under pressure by said compressor between a circulation system for heating, wherein the refrigerant is circulated in the order of said compressor, said heat exchange means for the drying vessel, said capillary tube, said heat exchange means for the heat recoverer and the compressor; and a circulation system for cooling, wherein the refrigerant is circulated in the order of said compressor, said radiator, said capillary tube, said heat exchange means for the drying vessel and said compressor;

wherein said heat exchange means for said drying vessel further comprise a water circulation pipe which includes a first heat exchanger disposed integrally in said refrigerant piping of said heat pump and a third heat exchanger disposed in said drying vessel, and said heat exchange means for said heat recoverer further comprise a water circulation pipe which includes a second heat exchanger disposed integrally in said piping of said heat pump and a fourth heat exchanger disposed in said heat recoverer, and the heat of the refrigerant flowing through said piping of said heat pump is once heat-exchanged with water and thereafter transmitted to said drying vessel and said heat recoverer.

13. A vacuum drying apparatus comprising:

a drying vessel which is formed as a pressure-resistant closed vessel and which receives therein a material to be dried;

a steam discharge passage connected to an upper portion of said drying vessel to discharge steam which is produced within said drying vessel;

a heat recoverer connected to said drying vessel through said steam discharge passage;

means for exhaust and drainage mounted to said heat recoverer;

a heat pump comprising a closed circulation piping with a refrigerant sealed therein as well as a compressor and a capillary tube which are disposed in line with said piping;

a radiator provided in said heat pump;

heat exchange means for said drying vessel which introduce heat from the refrigerant flowing through said piping of said heat pump into said drying vessel by directly exchanging heat between said refrigerant flowing through said piping and said drying vessel; and heat exchange means for said heat recoverer which introduce heat from the refrigerant flowing through said piping of said heat pump into said heat recoverer by exchanging heat with said heat recoverer, said piping of said heat pump being provided with flow path switching means to switch the flow of the refrigerant which is fed under pressure by said compressor between a circulation system for heating, wherein the refrigerant is circulated in the order of said compressor, said heat exchange means for the drying vessel, said capillary tube, said heat exchange means for the heat recoverer and the compressor; and a circulation system for cooling, wherein the refrigerant is circulated in the order of said compressor, said radiator, said capillary tube, said heat exchange means for the drying vessel and said compressor.

14. A vacuum drying apparatus according to claim 13, wherein said heat exchange means for said drying vessel and said heat exchange means for said heat recoverer each comprise a part of said piping of said heat pump disposed integrally in said drying vessel and said heat recoverer, respectively, wherein said heat exchange means for said drying vessel transmits the heat of the refrigerant flowing through said piping directly to said drying vessel, and said heat exchange means for said heat recoverer transmits heat from the refrigerant flowing through said piping for said heat recoverer.

* * * * *